US007443044B2

(12) United States Patent
Shimazaki et al.

(10) Patent No.: US 7,443,044 B2
(45) Date of Patent: Oct. 28, 2008

(54) ENGINE CONTROL DEVICE

(75) Inventors: Mitsuyoshi Shimazaki, Numazu (JP); Kazuyoshi Kishibata, Numazu (JP); Tomohiro Kinoshita, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 20 days.

(21) Appl. No.: 11/789,158

(22) Filed: Apr. 24, 2007

(65) Prior Publication Data

US 2007/0284888 A1 Dec. 13, 2007

(30) Foreign Application Priority Data

Apr. 27, 2006 (JP) ............................ 2006-123068

(51) Int. Cl.
*F02N 11/00* (2006.01)
*H02P 9/04* (2006.01)

(52) U.S. Cl. ...................................... 290/38 R; 322/14

(58) Field of Classification Search ............... 290/38 R, 290/46, 48 C; 322/14, 44
See application file for complete search history.

(56) References Cited

U.S. PATENT DOCUMENTS 3,500,799 A * 3/1970 Benson ....................... 123/478
3,589,345 A * 6/1971 Benson ....................... 123/478
4,175,506 A * 11/1979 Sakamoto et al. ...... 123/406.52
4,329,970 A * 5/1982 Mowery ............... 123/406.29
2007/0199533 A1* 8/2007 Takahashi ................ 123/179.4
2007/0284888 A1* 12/2007 Shimazaki et al. ........ 290/38 C
2008/0105230 A1* 5/2008 Kishibata et al. ......... 123/179.5

FOREIGN PATENT DOCUMENTS

JP 06-307262 11/1994

* cited by examiner

*Primary Examiner*—Julio Gonzalez
(74) *Attorney, Agent, or Firm*—Pearne & Gordon LLP

(57) ABSTRACT

An engine control device that controls an engine having a brushless motor as a starter motor, wherein the control device comprises a pickup coil that outputs a pulse signal at a crank angle position set in a crank angle section where a load applied to the brushless motor in cranking the engine is light, said brushless motor including a stator, a rotor and a position detecting device that detects rotational angle positions of the rotor to output position detection signals which represent level changes at fixed crank angle positions of the engine, and the control device being constructed so as to identify a crank angle position corresponding to each position where the level of the position detection signal is changed, based on the output signal of the pickup coil and to obtain crank angle information from the level changes of the position detection signals to control ignition timing or the like.

4 Claims, 5 Drawing Sheets

ENGINE CONTROL DEVICE

BACKGROUND OF THE INVENTION

The present invention relates to an engine control device that controls an engine comprising a brushless motor as a starter motor using a microcomputer.

PRIOR ART OF THE INVENTION

As disclosed in Japanese Patent Application Laid-Open No. 6-307262, an engine control device comprises a pickup coil that outputs a pulse signal when a rotational angle position of an engine matches a predetermined crank angle position, and uses crank angle position information of the engine obtained from the pulse signal output by the pickup coil to perform control of ignition timing of the engine or control of fuel injection timing and fuel injection time.

The pickup coil is pulse signal generation means of magnetic flux change detection type that detects a change in magnetic flux generated by rotation of an engine to output a pulse signal, and thus can generate a pulse signal of identifiable level only when a rotational speed of the engine is increased to some extent. If the rotational speed becomes, for example, lower than 100 r/min at the start of the engine, the pickup coil cannot generate a pulse signal of threshold level (a minimum value of level identifiable by a microcomputer) or higher. A lower limit of a rotational speed of an engine required for outputting a pulse signal of threshold level or higher from a pickup coil is herein referred to as a "signal detection lower limit speed".

If the rotational speed of the engine is lower than the signal detection lower limit speed, the control device cannot obtain crank angle position information of the engine, and thus cannot cause an ignition device of the engine to perform an ignition operation. When a fuel injection device is used as a device for supplying fuel to the engine, fuel injection can be performed only when the pickup coil generates a pulse signal of identifiable level.

In order to start the engine, it is required to cause fuel injection before the start of an intake stroke or at least in an initial stage of the intake stroke at the start of the engine, and cause an ignition operation near a crank angle position where a piston reaches a top dead center of a compression stroke. For this purpose, the pickup coil needs to output a pulse signal of threshold level or higher in a process that the piston of the engine is displaced toward the top dead center of the compression stroke.

Thus, in the engine that is started using a brushless motor as a starter motor, specifications of the brushless motor are determined so that even in the process that the piston is displaced toward the top dead center of the compression stroke at the start of the engine (in a process that a load applied to the brushless motor at the start of the engine is the heaviest), the brushless motor generates output torque required for rotating the engine at the rotational speed of the signal detection lower limit speed (100 r/min in the above described example) or higher.

As described above, in the conventional engine control device, the specifications of the brushless motor are determined so that even in the process that the load applied to the brushless motor from the engine at the start of the engine is the heaviest, the brushless motor generates the output torque required for rotating the engine at the rotational speed of the signal detection lower limit speed or higher. This increases the sizes of the brushless motor and the engine.

SUMMARY OF THE INVENTION

An object of the present invention is to provide an engine control device that can properly perform various types of control such as ignition timing control or fuel injection control in an extremely low rotational speed area of an engine without using a large brushless motor for starting the engine.

The present invention is applied to an engine control device including a control portion that performs various types of control including ignition timing control of an engine using, as a starter motor, a brushless motor including a stator having polyphase armature coils, a rotor having a magnetic field with 2n poles (n is an integer equal to or larger than 1), a position detection device that outputs a rectangular wave position detection signal that represents a level change for each rotation of the rotor by a predetermined angle, and a motor driving portion that passes a driving current through the polyphase armature coils in an energization pattern determined according to the position detection signal so as to rotate the rotor.

The present invention further includes: a pickup coil that detects a change in magnetic flux at a predetermined crank angle position of the engine to output a pulse signal; and crank angle position detection means that detects a crank angle position of the engine corresponding to each level change represented by the position detection signal based on the pulse signal output by the pickup coil. The rotor of the brushless motor is connected to a crankshaft so that a relationship between a rotational angle position of the rotor of the brushless motor and the crank angle position of the engine is uniquely determined. The pickup coil is provided to output the pulse signal in a crank angle section where a load applied to the brushless motor in cranking the engine is light, and the brushless motor is comprised so as to generate, in cranking the engine, output torque required for rotating the engine at a rotational speed required for the pulse signal generated by the pickup coil to be a threshold level or higher. The control portion is comprised so as to obtain crank angle information of the engine from the level change of the position detection signal, the crank angle position corresponding to the level change being detected by the crank angle position detection means, and perform various types of control.

The position detection device preferably includes a position sensor that detects a magnetic pole of the rotor at a detection position set with respect to an armature coil of each phase of the stator, and outputs a signal that represents the level change as the position detection signal for each switching of the polarity of the detected magnetic pole. In this case, a magnetic detection element such as a hall IC is preferably used as the position sensor.

According to the present invention, when the piston of the engine exceeds a top dead center of a compression stroke and enters an expansion stroke, and a load applied to the brushless motor is lightened at the start of the engine, a rotational speed of the brushless motor is increased beyond a signal detection lower limit speed, and the pickup coil outputs the pulse signal of the threshold level or higher. When the pickup coil outputs the pulse signal, the crank angle position detection means identifies a relationship between the level change of the position detection signal and the crank angle position of the engine.

In the present invention, the engine to be controlled is preferably a single-cylinder two-stroke engine, or a two-cylinder four-stroke engine with strokes in two cylinders shifted by 360°.

As described above, in the present invention, the pulse signal output by the pickup coil is used only for detecting the crank angle position of the engine corresponding to each level change represented by the position detection signal obtained from the position detection device provided in the brushless motor, and the crank angle position information of the engine is calculated from the level change of the position detection signal, the crank angle position corresponding to the level change being detected.

The position detection signal represents the level change at a fixed crank angle position and fixed number of times during one combustion cycle of the engine, and the position where the position detection signal represents the level change and the crank angle position of the engine correspond to each other in one manner. Thus, the crank angle position of the engine corresponding to each level change represented by the position detection signal can be automatically detected, after once detected, by means such as assigning numbers in order to a series of level changes represented by the position detection signal.

When the crank angle position corresponding to each level change represented by the position detection signal is detected based on the pulse signal output by the pickup coil with the load applied from the engine to the brushless motor being lightened, the brushless motor may merely generate output torque required for rotating the engine at the rotational speed equal to or higher than the signal detection lower limit speed with the load being lightened, thereby allowing use of a smaller brushless motor than conventional.

As described above, according to the present invention, specifications of the brushless motor are determined so as to rotate the engine at the rotational speed required for the pickup coil to output the pulse signal of threshold level or higher (at the signal detection lower limit speed or higher) in a crank angle section where the cranking load of the engine is light (with the load applied from the engine to the brushless motor being lightened) at the start of the engine. Thus, as compared with a conventional control device in which specifications of a brushless motor are determined so as to rotate an engine at a signal detection lower limit speed or higher even in a final stage of a compression stroke (even in a process that a load of the brushless motor becomes the heaviest) at the start of the engine, a smaller brushless motor can be used, thereby allowing reduction in size and weight of the engine.

According to the present invention, even when an increase in the load causes the rotational speed of the engine to be lower than the signal detection lower limit speed after the start of the engine, the crank angle position information of the engine can be obtained to perform ignition timing control or fuel injection control of the engine, thereby allowing an engine to be obtained that resists stalling in overloading.

BRIEF DESCRIPTION OF THE DRAWINGS

The above and other objects and features of the invention will be apparent from the detailed description of the preferred embodiment of the invention, which is described and illustrated with reference to the accompanying drawings, in which.

DETAILED DESCRIPTION OF THE PREFERRED EMBODIMENT

Now, a preferred embodiment of the present invention will be described with reference to the drawings.

Figure 1:
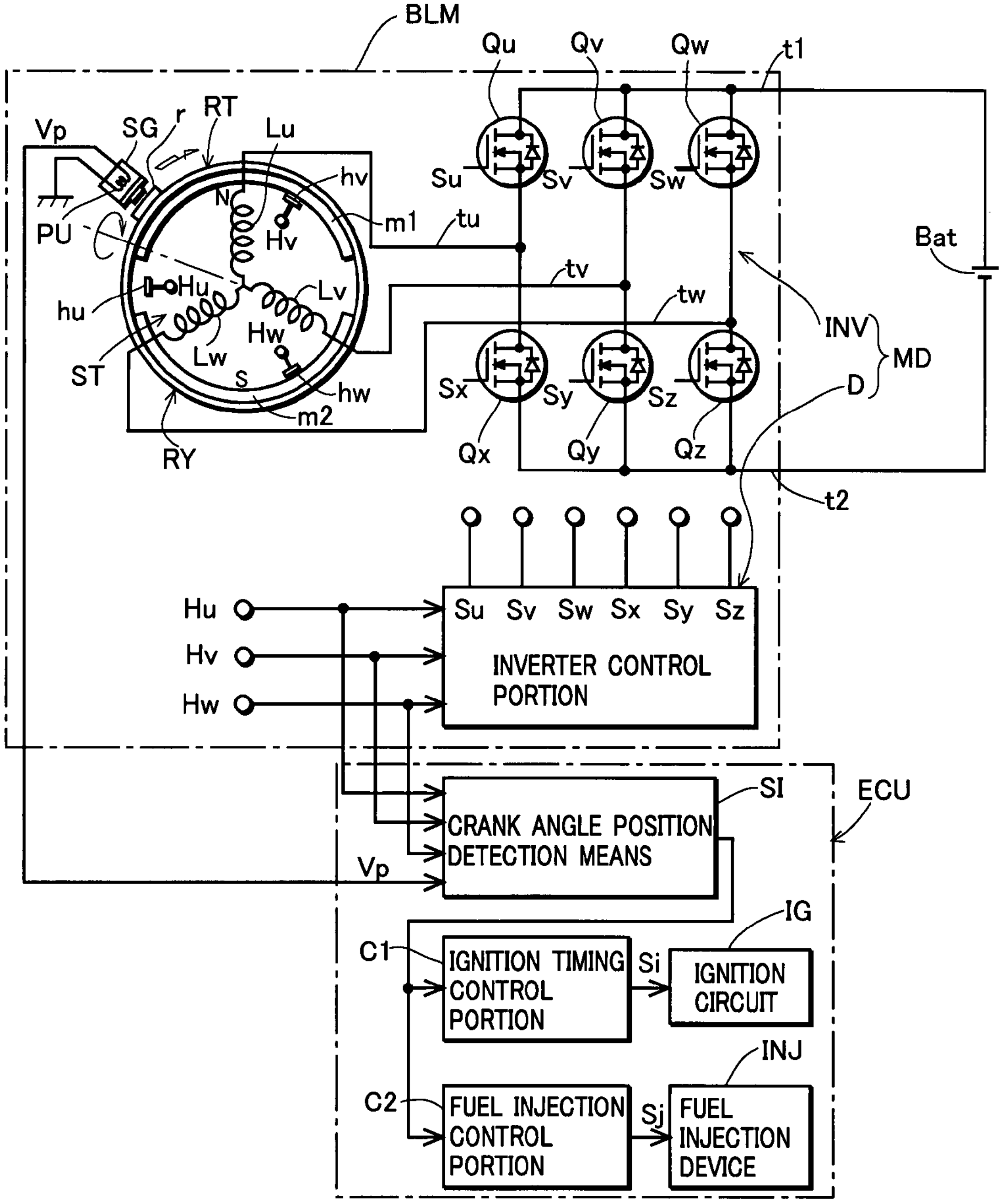
FIG. 1 is a schematic circuit diagram of a construction of hardware of an embodiment of the present invention.

FIG. 1 shows an exemplary construction of hardware of an engine control device according to the present invention, together with a construction of a brushless motor mounted to an engine. In FIG. 1, BLM denotes a brushless motor used as a starter motor that starts the engine, ECU denotes an engine control device according to the present invention, and Bat denotes a battery as a power supply. The engine to be controlled in the embodiment is a two-cylinder four-stroke engine with combustion strokes in two cylinders shifted by just 360°.

The brushless motor BLM comprises a stator ST and a rotor RT. In FIG. 1, basic constructions of the rotor RT and the stator ST are shown, and the stator ST is constituted by three-phase armature coils Lu, Lv and Lw wound around three poles provided in a stator iron core. The rotor RT is comprised by permanent magnets m1 and m2 mounted to an inner periphery of a cup-shaped rotor yoke RY to form a magnetic field with two poles.

The brushless motor also comprises a position detection device including position sensors hu, hv and hw that detect a magnetic pole of the rotor RT at a detection position set with respect to the armature coil of each phase of the stator ST, and outputs a position detection signal that represents a level change for each switching of the polarity of the detected magnetic pole, and a motor driving portion MD that passes a driving current through the three-phase armature coils in an energization pattern determined according to the position detection signal output by the position detection device so as to rotate the rotor RT. A hall IC is used as the position sensor.

The motor driving portion MD is comprised of an inverter circuit INV constituted by three switch elements Qu to Qw that form an upper side of a bridge, and three switch elements Qx to Qz that form a lower side thereof, and having DC terminals t1 and t2 and three-phase AC terminals tu to tw, and an inverter control portion D that provides drive signals Su to Sw and Sx to Sz to the switch elements Qu to Qw and Qx to Qz of the inverter circuit INV so as to pass the driving current through the three-phase armature coils in the energization pattern determined according to the position detection signal output by the position detection device so as to rotate the rotor RT in a predetermined direction.

In the shown inverter circuit INV, MOSFETs having drains commonly connected to the DC terminal t1 are used as the switch elements Qu to Qw that form the upper side of the bridge, and MOSFETs having sources commonly connected to the DC terminal t2 and drains connected to sources of the MOSFETs that comprise the switch elements Qu to Qw are used as the switch elements Qx to Qz that form the lower side of the bridge. In the shown example, parasitic diodes formed between the drains and the sources of the MOSFETs that comprise the switch elements Qu to Qw and Qx to Qz comprise a full-wave rectifier circuit that rectifies an AC output of a generator when the brushless motor is driven from the engine to function as the generator.

As the switch elements Qu to Qw and Qx to Qz that comprise the inverter circuit, other switch elements may be used such as bipolar transistors that can be controlled on/off. When the bipolar transistors are used as the switch elements Qu to Qw and Qx to Qz, diodes that comprise a full-wave rectifier circuit when the brushless motor operates as a generator are connected in anti-parallel between collectors and emitters of the transistors.

In the shown example, the armature coils Lu to Lw are star-connected, and terminals of the armature coils opposite to a neutral point are connected to three-phase AC terminals tu to tw of the inverter circuit INV. A battery Bat is connected between the DC terminals t1 and t2 of the inverter circuit INV.

When the rotor RT in FIG. 1 is rotated in the direction of arrow (clockwise), the inverter control portion D provides the drive signals Su to Sw and Sx to Sz to the switch elements Qu to Qw and Qx to Qz that comprise the inverter circuit INV to control on/off the switch elements Qu to Qw and Qx to Qz according to the position detection signals Hu to Hw output by the position sensors hu to hw so as to pass a driving current through the three-phase armature coils Lu to Lw in an energization pattern, for example, shown in FIG. 2.

Figures 2A, 2B, 2C, 2D, 2E, 2F, 2G, 2H, 2I:
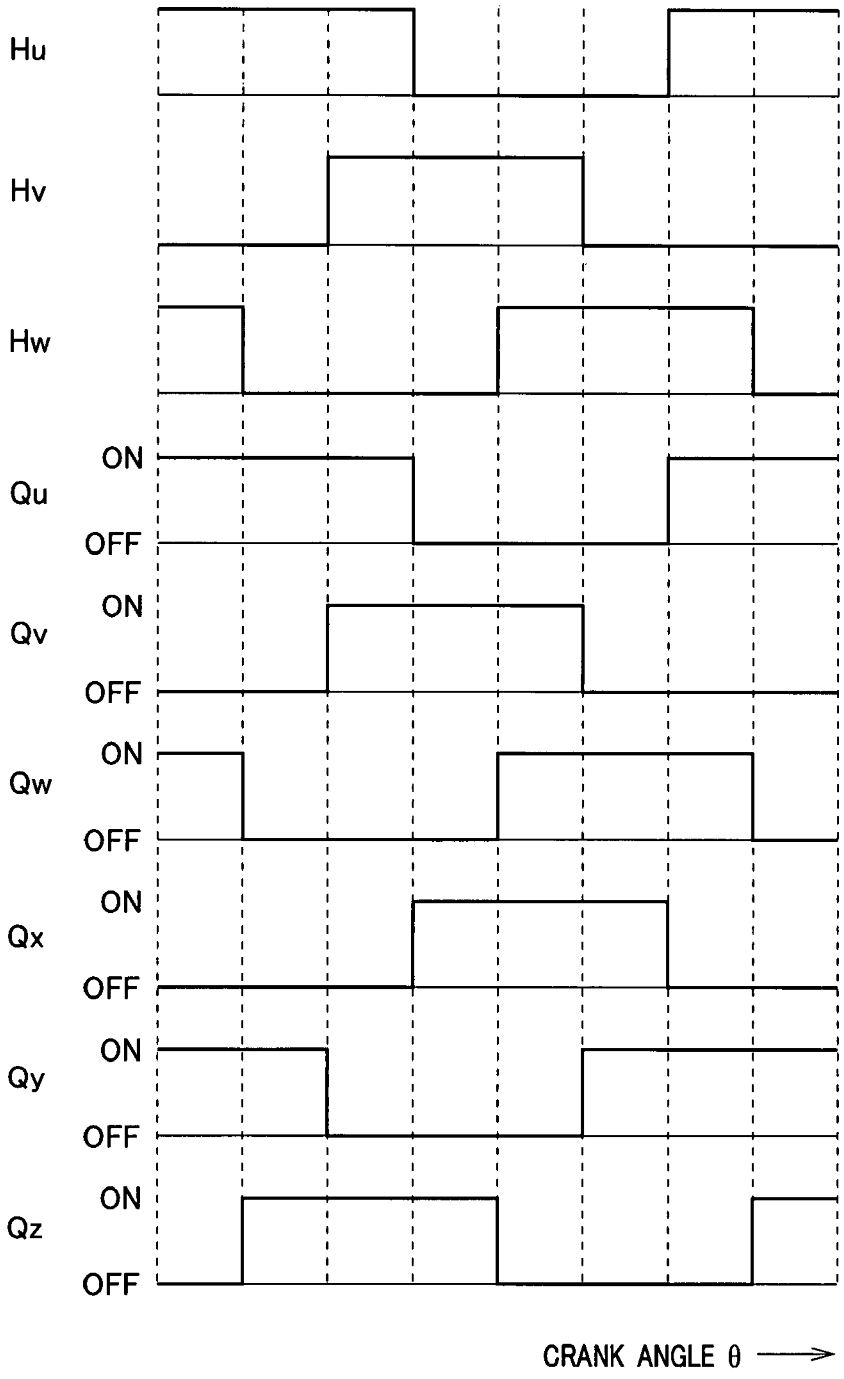
FIGS. 2A to 2I are waveform charts showing position detection signals output by a position sensor of a brushless motor in the embodiment of the present invention and an energization pattern of an inverter circuit.

FIGS. 2A to 2C denote position detection signals Hu to Hw, respectively, FIGS. 2D to 2I denote changes in ON/OFF state of the switch elements Qu, Qv, Qw, Qx, Qy and Qz, respectively. While these switch elements are in the ON state, the driving current passes from the battery to the armature coils Lu to Lw through the switch elements in the ON state.

The brushless motor BLM is operated as the starter motor at the start of the engine, but is driven by the engine after the start of the engine and thus functions as a magnet type AC generator. An AC current output by the generator is rectified by the full-wave rectifier circuit comprised by the parasitic diodes formed between the drains and the sources of the MOSFETs that comprise the switch elements Qu, Qv, Qw, Qx, Qy and Qz of the inverter circuit, and supplied to the battery Bat and an unshown load connected to the battery.

As described above, the inverter control portion D controls timing for providing the drive signals Su to Sw and Sx to Sz to the switch elements Qu to Qw and Qx to Qz that comprise the inverter circuit INV according to the output of the position sensors hu to hw so as to rotate the rotor RT in a direction of starting the engine at the start of the engine. On the other hand, when the brushless motor operates as the magnet type AC generator after the start of the engine, the inverter control portion D controls the inverter circuit INV so as to maintain an output voltage of the generator within a range suitable for charging the battery Bat. This control is performed as described below. Specifically, when the output voltage of the generator is lower than a set value, all the MOSFETs that comprise the inverter circuit INJ are maintained in the OFF state to supply a rectified output of the generator as it is to the battery, and when the output voltage of the generator is lower than the set value, for example, the three MOSFETs that form the lower side of the bridge of the inverter circuit are simultaneously turned on to short-circuit the output of the generator to stop charging the battery.

The rotor RT of the brushless motor is connected to a crankshaft directly or via a gear having a fixed transmission gear ratio so that a relationship between a rotational angle position of the rotor and a crank angle position of the engine is uniquely determined. In the embodiment, the rotor RT is connected directly to the crankshaft of the unshown engine.

On an outer periphery of the yoke RY of the rotor RT of the brushless motor, a reluctor (an arcuate protrusion extending circumferentially of the yoke) r is provided, and a signal generator SG that detects a leading edge and a trailing edge in a rotational direction of the reluctor to generate a pulse signal is placed near the rotor RT.

The signal generator SG is a known one comprising an iron core having a magnetic pole portion facing the reluctor r, a permanent magnet magnetically connected to the iron core, and a pickup coil PU wound around the iron core, and the pickup coil PU detects changes in magnetic flux caused in the iron core when the reluctor r starts and finishes facing the magnetic pole portion of the iron core of the signal generator to output a pair of pulse signals with different polarities. In the embodiment, among the pair of pulse signals, a pulse signal Vp generated earlier is used as a reference signal in detecting the crank angle positions corresponding to each level change of the position detection signals Hu to Hw generated by the position detection device (the position sensors hu to hw).

In the example in FIG. 1, the rotor RT of the brushless motor has a pair of (two-pole) magnetic fields, the three-phase armature coils Lu to Lw provided in the stator are comprised by single coils, and this is a pair-pole construction. In this construction, a section of one cycle of a current passing through each of the three-phase armature coils Lu to Lw is a section of 360° of an electrical angle. An actual brushless motor has an n-pair-pole construction (n is an integer equal to or larger than one) in order to reduce cogging. The three-phase brushless motor having the n-pair-pole construction is comprised of a rotor having a 2n-pole magnetic field, and 3m (m is an integer equal to or larger than one) armature coils. In the n-pair-pole brushless motor, a section of a mechanical angle of (360/n)° corresponds to the section of the electrical angle of 360°.

Figure 3:
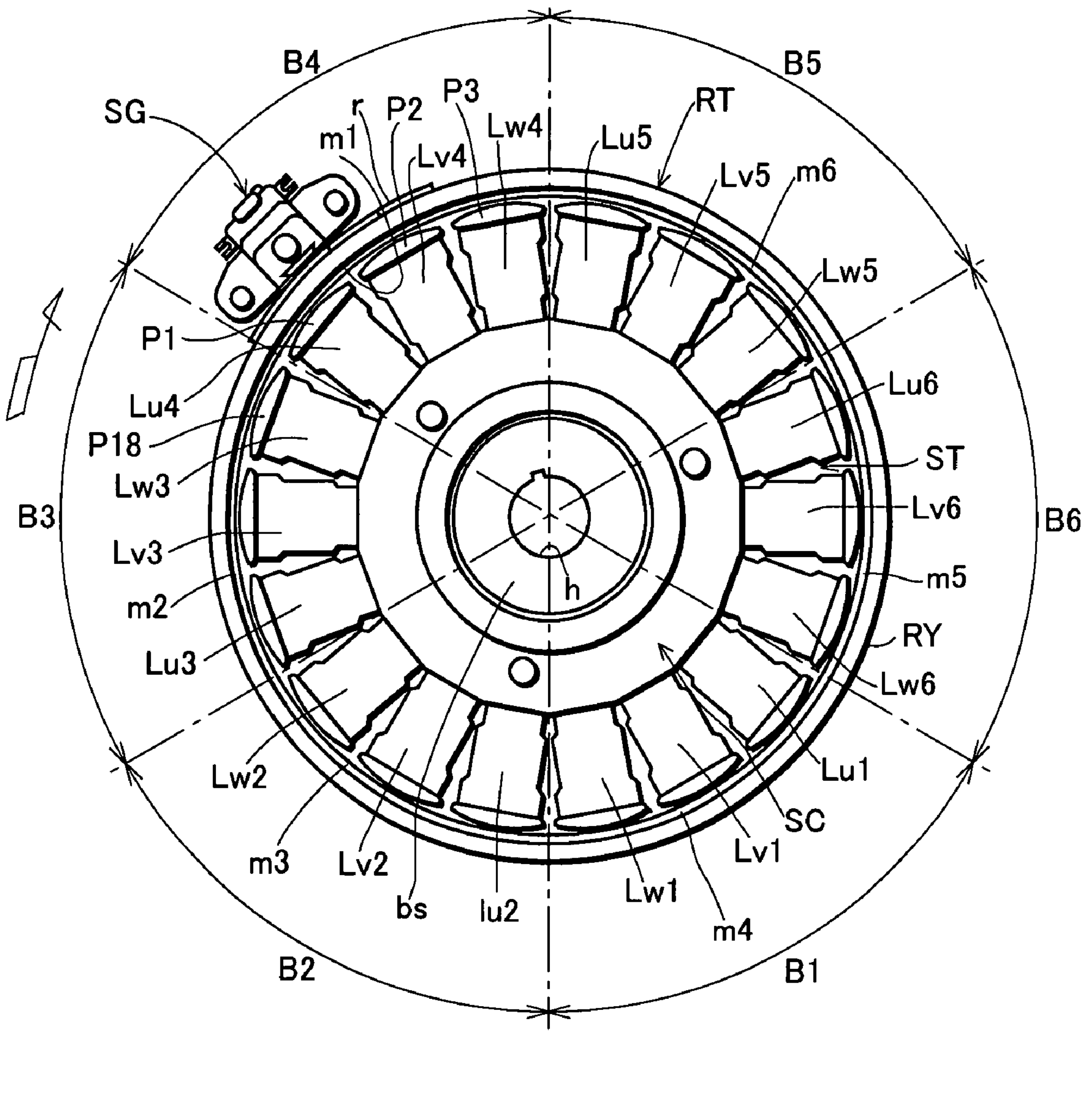
FIG. 3 is a front view of an exemplary construction of a rotor and a stator of the brushless motor used in the embodiment of the present invention.

The brushless motor BLM actually used in the embodiment has a six-pair-pole construction as shown in FIG. 3. In the brushless motor in FIG. 3, the rotor RT has 12-pole magnetic fields and the stator iron core SC has 18 poles P1 to P18. A circumferential area of the stator iron core SC can be divided into six blocks B1 to B6 each having an angle width of 60° (the electrical angle of 360°). Each of the six blocks has three poles, and the coils (Lu1, Lv1, Lw1), (Lu2, Lv2, Lw2), (Lu3, Lv3, Lw3), (Lu4, Lv4, Lw4), (Lu5, Lv5, Lw5) and (Lu6, Lv6, Lw6) are wound around the three poles in each block. The coils of the same phase are connected in series or parallel to comprise the three-phase armature coils Lu to Lw.

In FIG. 3, a reference character bs denotes a boss formed in the center of a bottom wall portion of the rotor yoke RY, and a taper portion provided in the crankshaft of the unshown engine is fitted in a taper hole h provided in the boss. The boss bs is fastened to the taper portion of the crankshaft by appropriate means to mount the rotor RT to the crankshaft of the engine.

The reluctor r is formed on the outer periphery of the rotor yoke RT, and the signal generator SG comprising the pickup coil that detects the edges of the reluctor to generate the pulse signal is placed near the rotor RT and secured to a case or the like of the engine. In the present invention, the signal generator SG is placed so that the pickup coil provided in the signal generator SG detects the leading edge in the rotational direction of the reluctor r to generate the pulse signal Vp in a final stage of an expansion stroke of one cylinder of the engine (a final stage of an intake stroke of the other cylinder) where a load applied from the engine to the brushless motor at the start of the engine is significantly lightened.

The engine control device ECU performs control required for maintaining rotation of the engine such as ignition control or fuel injection control of the engine using a microcomputer. In the embodiment, the control device comprises crank angle position detection means SI that detects a crank angle position of the engine corresponding to each level change represented by the position detection signals Hu to Hw output by the position detection device. As described later, the crank angle position detection means SI detects a crank angle position corresponding to each level change represented by the position detection signals Hu to Hw (a crank angle position when each level change occurs) based on the pulse signal Vp output by the pickup coil PU.

FIGS. 4A to 4G show waveforms of the position detection signals Hu, Hv and Hw output by the position sensors hu, hv and hw in the embodiment, a change in rotational speed at the start of the engine, and waveforms of the pulse signals output by the pickup coil PU, with the crank angle θ on the axis of abscissa.

The pickup coil PU is provided to output pulse signals Vp and Vp' in a crank angle section where a cranking load of the engine (a load applied from the engine to the starter motor in cranking the engine) is light. The crank angle section where the cranking load of the engine is light is, for example, a full section of an expansion stroke, an exhaust stroke, or an intake stroke, or an initial section of a compression stroke of a combustion cycle in each cylinder of the engine. In the embodiment, the pickup coil PU is provided so as to output the pulse signals Vp and Vp' when one of the two cylinders of the engine is in a final stage of the expansion stroke, and the other is in a final stage of the intake stroke.

Figures 4A, 4B, 4C, 4D, 4E, 4F, 4G:
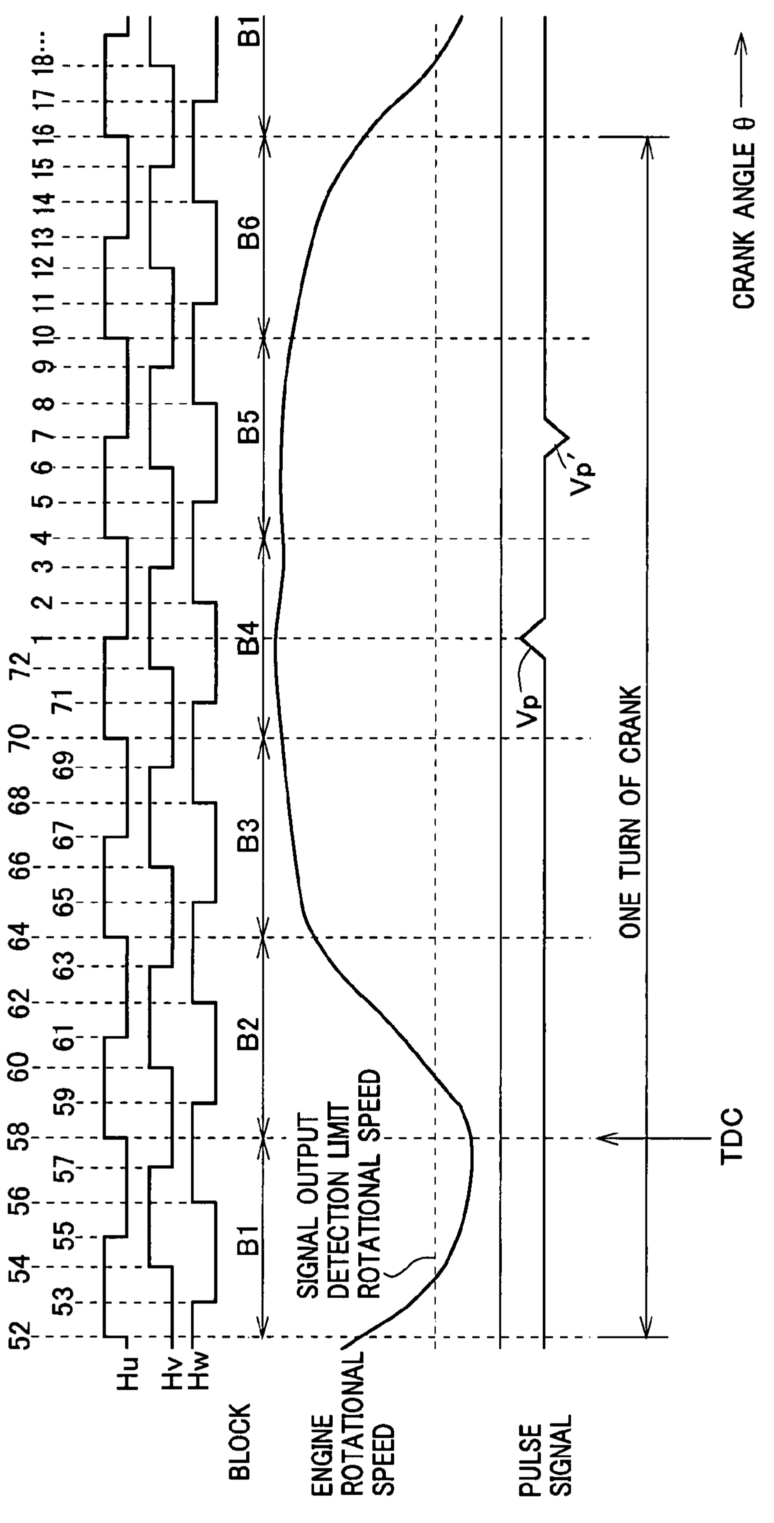
FIGS. 4A to 4G are waveform charts showing the position detection signals output by the position sensor in the embodiment of the present invention, a change in rotational speed at the start of the engine, and waveforms of pulse signals output by the pickup coil, together with a series of numbers assigned to level change positions of the position detection signals, crank angle positions corresponding to the level change positions being detected.

In order to generate a pulse signal of threshold level or higher from the pickup coil PU, the engine needs to be rotated at a rotational speed equal to or higher than the signal detection lower limit speed. FIG. 4F shows a change in the rotational speed of the engine along with the stroke change of the engine when the brushless motor BLM cranks the engine. After the start of the engine, in a process that a piston is displaced toward a top dead center (TDC) in the cylinder in the compression stroke, the load applied from the engine to the brushless motor BLM is increased to reduce the rotational speed of the engine, while when the piston exceeds the top dead center and the cylinder having been in the compression stroke enters the expansion stroke, the load applied to the brushless motor is lightened to rapidly increase the rotational speed of the engine.

In the present invention, as shown in FIG. 4F, specifications of the brushless motor BLM are determined so that while any of the cylinders of the engine is in the compression stroke, the rotational speed of the engine is allowed to be lower than the signal detection lower limit speed, while after the piston in the cylinder exceeds the top dead center of the compression stroke and enters the expansion stroke, the rotational speed of the engine can be increased to a rotational speed sufficiently higher than the signal detection lower limit speed. Specifically, in the present invention, as compared with a conventional engine system in which specifications of a brushless motor are determined so as to rotate an engine at a signal detection lower limit speed or higher even while any of cylinders of the engine is in a compression stroke, a smaller brushless motor can be used.

In the present invention, the pickup coil PU is comprised so as to generate the pulse signals Vp and Vp' in an area where the brushless motor increases the rotational speed of the engine to be higher than the signal detection lower limit speed at the start of the engine. Thus, the microcomputer in the control device ECU can reliably identify the pulse signals Vp and Vp' at the start of the engine.

The position sensors hu to hw are constituted by hall ICs, and detect the magnetic pole of the rotor to output the rectangular wave position detection signals Hu to Hw having different levels according to the polarity of the detected magnetic pole as shown in FIGS. 4B to 4D. These position detection signals are generated in the same pattern while the rotor RT is rotated in sections of six blocks B1 to B6 of the stator (the section of the electrical angle of 360°).

From the position detection signals Hu to Hw, the crank angle position in each section of the electrical angle of 360° can be detected. For example, if the states of the position detection signals Hu, Hv and Hw immediately after any of the position detection signals represents the level change are denoted by 0 and 1, the positions where the position detection signals represent the changes can be denoted as (101), (100), (110), (010), (011) and (001), and these positions are at 0°, 10°, 20°, 30°, 40° and 50° from a start position of each block. Thus, identifying the states of the three position detection signals immediately after any of the position detection signals represents the level change allows the angle of the position where the level change occurs from the start position of each block to be detected in increments of 10°.

However, only with the position detection signals Hu, Hv and Hw, it cannot be detected which of the blocks of the stator iron core the crank angle position detected from the signals belongs to. In order to rotate the brushless motor, it is sufficient that the crank angle position of the section of the electrical angle of 360° can be detected, but in order to detect the ignition timing or the fuel injection timing of the engine, which of the blocks the positions where the levels of the position detection signals Hu to Hw change belong to needs to be detected.

Thus, in the present invention, the crank angle position detection means SI is provided that detects the crank angle position corresponding to each level change represented by the position detection signal based on the pulse signal output by the pickup coil PU. It is previously found which block of the stator iron core the crank angle position where the pickup coil generates the pulse signal Vp belongs to, and thus the crank angle position detection means SI can detect which block of the stator iron core the crank angle position belongs to, to which the position where the series of position detection signals obtained from the position sensor represents the level change corresponds, based on the pulse signal Vp. For example, in the shown example, the pulse signal Vp is generated in the block B4, and thus it can be found that the position (010) where the position detection signal Hw represents the level change immediately after generation of the pulse signal Vp is the position (010) belonging to the block B4, that is, the crank angle position 30° apart from a starting point of the block B4. If it can be once identified which block the crank angle position belongs to, to which the position detection signal represents the level change corresponds, thereafter the relationship between the level change of the position detection signal and the crank angle position can be automatically identified.

As shown in FIG. 4A, when any of the position detection signals (the position detection signal Hu in the shown example) represents the level change simultaneously with or immediately after the generation of the pulse signal Vp, a count of a counter is set to an initial value (1 in the shown example), and thereafter the count of the counter is incremented by 1 every time any of the position detection signals represents the level change to renew the count of the counter for each rotation of the crankshaft by 10°. Until the crankshaft is rotated two turns and the count of the counter reaches a maximum value (72 in the shown example), the count of the counter is incremented every time the position detection signal represents the level change. When the position detection signal represents the level change after the count of the counter reaches the maximum value, the count of the counter is returned to the initial value, and the same process is thereafter repeated. Such operations are performed to allow the crank angle position in a section of 720° where one combustion cycle is performed in each cylinder of the engine to be detected in increments of 10°. In the shown example, when the crank angle position is detected from the level change of the position detection signal, the crank angle position where the count of the counter is 58 is the position where the piston reaches the top dead center of the compression stroke in one cylinder of the engine (the position where the piston reaches the top dead center of the exhaust stroke in the other cylinder).

The engine control device ECU obtains the crank angle information of the engine from the level change of the position detection signal, the relationship between the level change and the crank angle position of the engine being identified by the crank angle position detection means SI, and performs various types of control including ignition timing control of the engine.

In the shown example, the ECU comprises an ignition timing control portion C1 and an ignition circuit IG for controlling ignition timing of the engine. The ignition timing control portion C1 comprises rotational speed arithmetical operation means that arithmetically operates the rotational speed of the engine from a cycle of the position detection signal representing the level change, and ignition timing arithmetical operation means that searches a map with respect to the rotational speed arithmetically operated by the rotational speed arithmetical operation means and performs necessary interpolation to arithmetically operate the ignition timing of the engine when the start of the engine is completed. The ignition timing control portion C1 starts measuring the ignition timing arithmetically operated at a reference crank angle position, the reference crank angle position being a position with an advanced phase by a certain angle from the crank angle position (the position at the count of 58) corresponding to the position where the piston of the engine reaches the top dead center (TDC), for example, a crank angle position at the count of 55, and provides an ignition signal Si to the ignition circuit IG when the measurement of the arithmetically operated ignition timing is completed.

The ignition circuit IG is a known one comprising an ignition coil, and a primary current control circuit that controls a primary current of the ignition coil so as to cause a sudden change in the primary current of the ignition coil when the ignition signal is provided. The ignition circuit IG causes a sudden change in the primary current of the ignition coil when the ignition signal Si is provided, and thus induces a high voltage for ignition in the secondary coil of the ignition coil. The high voltage for ignition is applied to an ignition plug mounted to a cylinder in ignition timing of the engine, thereby causing spark discharge in the ignition plug and igniting the engine.

The ECU also comprises a fuel injection control portion C2 and a fuel injection device INJ. The fuel injection device INJ is comprised of an injector (an electromagnetic fuel injection valve) that opens a valve in response to the injection command signal Sj to inject fuel into an intake pipe or a cylinder of the engine, and a fuel pump that supplies fuel to the injector.

Pressure of the fuel supplied from the fuel pump to the injector is maintained constant, and thus the injection amount of the fuel is controlled by time for the injector to inject fuel (injection time).

The fuel injection control portion C2 is a known one comprising basic injection time arithmetical operation means that arithmetically operates, as basic fuel injection time, injection time for injecting fuel in an amount required for maintaining an air/fuel ratio of mixed gas in a suitable range with respect to an intake air amount of the engine, for example, estimated from the rotational speed and a throttle valve opening degree of the engine (or from intake pipe pressure and the rotational speed of the engine), injection time correction means that corrects the basic fuel injection time with respect to control conditions such as a temperature of the engine or atmospheric pressure to arithmetically operate actual injection time, and injection command signal output means that outputs a rectangular wave injection command signal Sj having a signal width corresponding to ineffective injection time added to the injection time arithmetically operated by the injection time arithmetical operation means.

The means for constructing the crank angle position detection means SI, the ignition timing control portion C1, and the fuel injection control portion C2 are achieved by the unshown microcomputer provided in the ECU executing a predetermined program. The means for constructing the inverter control portion D in FIG. 1 may be achieved by a microcomputer separate from the microcomputer in the ECU, or the microcomputer in the ECU. In the embodiment, the inverter control means D is constructed by the microcomputer in the ECU.

In the embodiment, the ignition timing control portion C1, and the fuel injection control portion C2 comprise a control portion that obtains the crank angle information of the engine from the level change of the position detection signal, the crank angle position corresponding to the level change being detected by the crank angle position detection means SI, and performs ignition timing control and fuel injection control.

Figure 5:
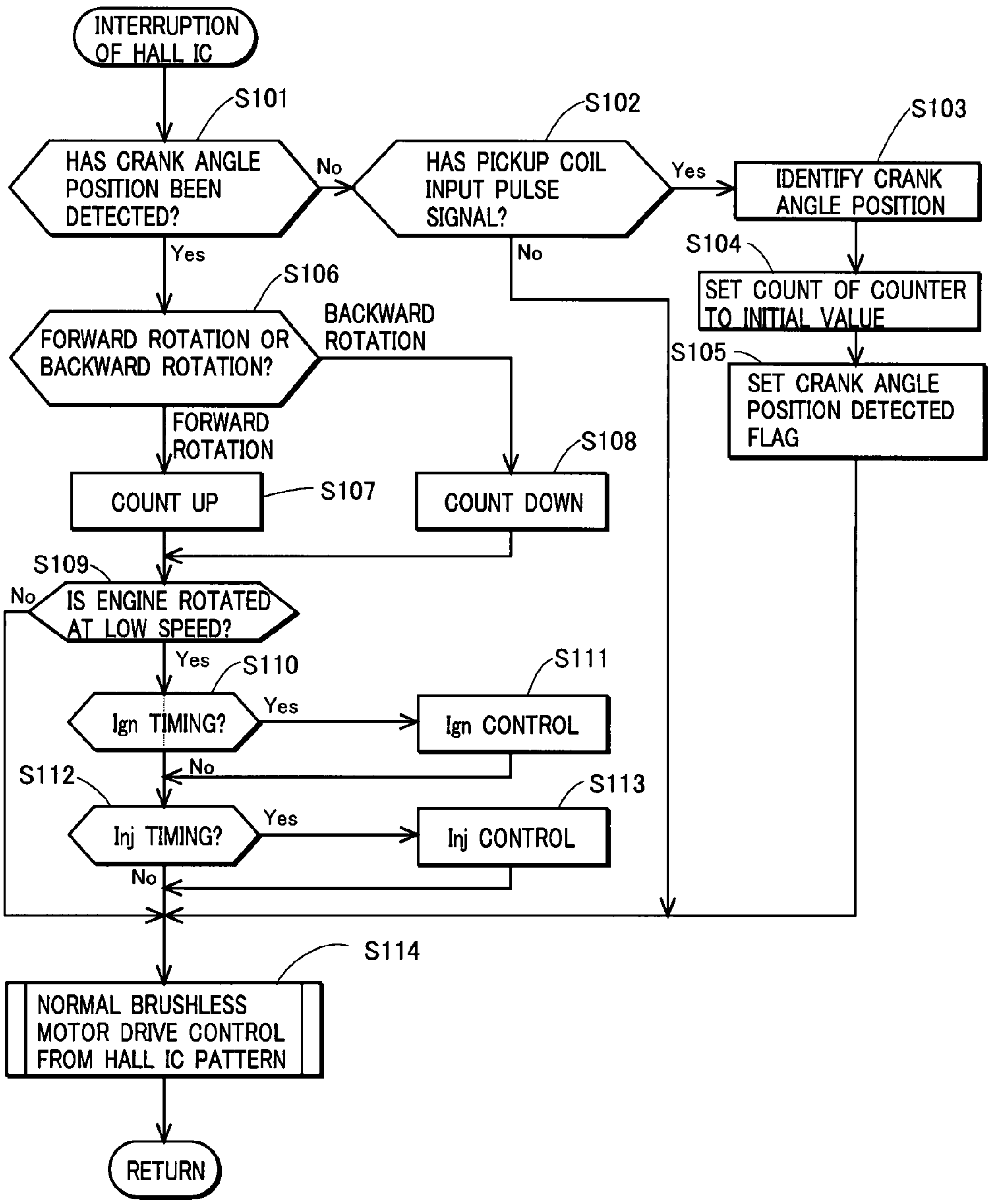
FIG. 5 is a flowchart of an example of an algorithm of interruption processing executed by a microcomputer for each level change of the position detection signal in the embodiment of the present invention.

FIG. 5 shows an example of an algorithm of processing executed by the microcomputer in the ECU for constructing the crank angle position detection means SI, the ignition timing control portion C1, the fuel injection control portion C2, and the inverter control portion D in the embodiment. In this example, the ignition operation is performed at a crank angle position suitable for an ignition position in extremely low speed rotation at the start of the engine, for example, a crank angle position at a count of 58 in FIG. 4, and fuel injection is started at a certain crank angle position suitable for starting injection of the fuel.

Processing in FIG. 5 is interruption processing executed every time the position detection signal output by the hall IC that comprises the position sensor represents the level change. When the processing in FIG. 5 is started, first in Step S101, it is determined whether the crank angle position has been detected. The crank angle position has not been detected at first, thus the process proceeds to Step S102, and it is determined whether a pulse signal is input from the pickup coil. When it is determined that the pulse signal is not input, the process moves to Step S114, an energization pattern of the brushless motor is determined based on the output of the position sensor, and a drive signal is provided to the switch elements of the inverter circuit INV so as to pass the driving current through the brushless motor according to the determined energization pattern, returning to a main routine.

In the unshown main routine executed by the microcomputer, processing of arithmetically operating the rotational speed of the engine from the generation cycle of the position detection signal output by the position sensor, processing of arithmetically operating ignition timing with respect to the arithmetically operated rotational speed, and processing of arithmetically operating fuel injection time.

When it is determined in Step S102 in FIG. 5 that the pulse signal Vp is input from the pickup coil, the process proceeds to Step S103, a crank angle position at that time is identified, and the count of the counter is set to an initial value (1 in the example in FIG. 4) in Step S104. Then, a crank position detected flag is set in Step S105, and the process proceeds to Step S114.

When it is determined in Step S101 in FIG. 5 that the crank angle position is detected (a crank angle position detection flag is set), the process proceeds to Step S106, and it is determined whether the engine is rotated forward or backward from the pattern of the position detection signal output by the position sensor. When the engine is rotated forward, the process proceeds to Step S107, and the count of the counter is incremented by one. When it is determined in Step S106 that the engine is rotated backward, the process proceeds to Step S108, and the count of the counter is decremented by one.

Then, the process proceeds to Step S109, and it is determined whether the engine is rotated at low speed (a speed before completion of the start) from the rotational speed arithmetically operated in the main routine. When it is determined that the engine is rotated at low speed, the process proceeds to Step S110. In Step S110, it is determined whether timing of this interruption processing is timing defined as ignition timing at the start (in this example, whether the interruption processing is performed at the position at the count of 58 in FIG. 4). When it is determined that the timing is the ignition timing at the start, in Step S111, the ignition signal Si is provided to the ignition circuit. When it is determined in Step S110 that this interruption timing is not the timing defined as the ignition timing, and when the processing of providing the ignition signal to the ignition circuit is completed in Step S111, Step S112 is then executed.

In Step S112, it is determined whether this interruption timing is timing for starting fuel injection. When it is determined that the interruption timing is the timing for starting the fuel injection, the process proceeds to Step S113 to cause the fuel injection device to provide an injection command signal. When it is determined in Step S112 that this interruption timing is not the timing for starting the fuel injection, and the processing for generating the injection command signal in Step S113 is completed, the process proceeds to Step S114 to perform control for driving the brushless motor.

According to the algorithm in FIG. 5, the crank angle position detection means is comprised by Steps S101 to S108. The means for controlling the ignition timing at the start of the engine among means that comprise the ignition timing control portion C1 is comprised by Steps S110 and S111, and the means for controlling the fuel injection at the start of the engine among means that comprise the fuel injection control portion C2 is comprised by Steps S112 and S113.

In the present invention, the small brushless motor is used that allows the rotational speed of the engine to be lower than the signal detection lower limit speed when any of the cylinders is in the compression stroke. Thus, when an increase in viscosity of a lubricant of the engine or the like increases torque required for starting the engine, it is supposed that the engine is nearly stopped in the compression stroke at the start. The position sensor provided in the brushless motor generates the position detection signal even while the rotor is stopped, and even if the engine is stopped or nearly stopped, a driving current can be continuously passed through the brushless motor so as to rotate the brushless motor in the direction of starting the engine. Even if the engine is stopped or nearly stopped in the compression stroke at the start, the brushless motor is continuously driven within a limit value range of the driving current of the brushless motor to gradually displace the piston toward the top dead center, thereby allowing the starting operation of the engine to be continued until the piston exceeds the top dead center. When the piston exceeds the top dead center, the load applied to the brushless motor is suddenly lightened to allow sudden acceleration of the brushless motor, and in the meantime, the crank angle position corresponding to the position where the position detection signal represents the level change is detected to allow crank angle position information of the engine to be obtained from the position detection signal.

In the embodiment, the engine is the two-cylinder four-stroke engine, but the present invention is effective in use of a single-cylinder two-stroke engine.

The above description is directed to the time at the start of the engine, but according to the present invention, information of the crank angle position can be obtained even when the load of the engine is significantly weighted and the rotational speed of the engine is reduced to be lower than the signal detection lower limit speed after the start of the engine, thereby allowing the ignition timing control and the fuel injection control of the engine to be properly performed to prevent stalling of the engine.

As in the present invention, the crank angle position information is obtained from each level change represented by the position detection signal obtained from the position detection device provided in the brushless motor, and thus the crank angle position information can be obtained in a fine manner (in increments of 10° in the above example) as compared with the case where the crank angle position information is obtained only from the pickup coil. Thus, there is no need for troublesome processing such as activating a timer when the pickup coil generates a specific pulse signal for a counting operation for detecting the crank angle position for starting the control, in detecting the crank angle position for starting specific control (for example, the position for starting the fuel injection), thereby simplifying the control.

In the embodiment, the three-phase brushless motor is used as the brushless motor, but the present invention may be applied in use of other polyphase brushless motor.

In the embodiment, the ECU has the fuel injection control portion, but the present invention may be, of course, applied to the case where an engine having no fuel injection device is to be controlled.

Although the preferred embodiment of the invention has been described and illustrated with reference to the accompanying drawings, it will be understood by those skilled in the art that it is by way of examples, and that various changes and modifications may be made without departing from the spirit and scope of the invention, which is defined only to the appended claims.

What is claimed is:

1. An engine control device comprising a control portion that performs various types of control including ignition timing control of an engine using, as a starter motor, a brushless motor including a stator having polyphase armature coils, a rotor having a magnetic field with 2n poles (n is an integer equal to or larger than 1), a position detection device that outputs a rectangular wave position detection signal that represents a level change for each rotation of said rotor by a predetermined angle, and a motor driving portion that passes a driving current through said polyphase armature coils in an energization pattern determined according to said position detection signal so as to rotate said rotor, wherein said engine control device further comprises:

a pickup coil that detects a change in magnetic flux at a predetermined crank angle position of said engine to output a pulse signal; and crank angle position detection means that detects a crank angle position of said engine corresponding to each level change represented by said position detection signal based on the pulse signal output by said pickup coil, said rotor is connected to a crankshaft so that a relationship between a rotational angle position of the rotor of said brushless motor and the crank angle position of said engine is uniquely determined, said pickup coil is provided to output said pulse signal in a crank angle section where a load applied to said brushless motor in cranking said engine is light, and said brushless motor is comprised so as to generate, in cranking said engine, output torque required for rotating said engine at a rotational speed required for said pulse signal generated by said pickup coil to be a threshold level or higher, and said control portion is comprised so as to obtain crank angle information of said engine from the level change of said position detection signal, the crank angle position corresponding to the level change being detected by the crank angle position detection means, and perform said various types of control.

2. The engine control device according to claim 1, wherein said position detection device includes a position sensor that detects a magnetic pole of said rotor at a detection position set with respect to an armature coil of each phase of said stator, and outputs a signal that represents the level change as said position detection signal for each switching of the polarity of the detected magnetic pole.

3. The engine control device according to claim 1, wherein said engine is a single-cylinder two-stroke engine.

4. The engine control device according to claim 1, wherein said engine is a two-cylinder four-stroke engine with strokes in two cylinders shifted by 360°.

* * * * *